US012656051B2

(12) United States Patent
Pit et al.

(10) Patent No.: US 12,656,051 B2
(45) Date of Patent: Jun. 16, 2026

(54) REFRIGERATOR WATER DISPENSER

(71) Applicant: Hisense USA Corporation, Suwanee, GA (US)

(72) Inventors: Heng Tong Pit, Suwanee, GA (US); Jeesuk Lee, Johns Creek, GA (US); Steven J. Kuehl, Sylva, NC (US); JinXiong Pi, Suwanee, GA (US); XueQing Liu, Suwanee, GA (US)

(73) Assignee: Hisense USA Corporation, Suwanee, GA (US)

( * ) Notice: Subject to any disclaimer, the term of this patent is extended or adjusted under 35 U.S.C. 154(b) by 10 days.

(21) Appl. No.: 18/636,213

(22) Filed: Apr. 15, 2024

(65) Prior Publication Data

US 2024/0344761 A1 Oct. 17, 2024

Related U.S. Application Data

(63) Continuation of application No. 18/636,040, filed on Apr. 15, 2024.

(60) Provisional application No. 63/574,568, filed on Apr. 4, 2024, provisional application No. 63/459,460, filed on Apr. 14, 2023, provisional application No. 63/459,456, filed on Apr. 14, 2023.

(51) Int. Cl.
| | |
|---|---|
| *F25D 23/12* | (2006.01) |
| *A47J 31/06* | (2006.01) |
| *A47J 31/52* | (2006.01) |
| *A47J 31/54* | (2006.01) |

(52) U.S. Cl.
CPC ........ *F25D 23/126* (2013.01); *A47J 31/0631* (2013.01); *A47J 31/525* (2018.08); *A47J*

*31/54* (2013.01); *F25D 2323/122* (2013.01); *F25D 2700/06* (2013.01)

(58) Field of Classification Search
CPC ...................... B67D 7/46; B67D 7/465; B67D 2210/00036; B67D 2001/1265; B67D 2001/1259; B67D 1/124; B67D 1/1238; B67D 1/0894; B67D 1/0003; B65B 43/58; B65B 43/59
See application file for complete search history.

(56) References Cited

U.S. PATENT DOCUMENTS

| | | | | | |
|---|---|---|---|---|---|
| 689,468 | A | * | 12/1901 | Dobbyn | B67D 7/005 222/453 |
| 966,270 | A | * | 8/1910 | Van Leir | B65B 3/30 141/354 |
| 2,679,347 | A | * | 5/1954 | Franz | B67C 3/2637 141/55 |

(Continued)

FOREIGN PATENT DOCUMENTS

| | | |
|---|---|---|
| GB | 2137962 A | 10/1984 |

*Primary Examiner* — Timothy L Maust
(74) *Attorney, Agent, or Firm* — Bodman PLC

(57) ABSTRACT

A refrigerator includes a water dispenser and a liquid storage receptacle configured to be automatically filled via the water dispenser. The liquid storage receptacle includes a dispenser for opening a fluid channel between the liquid storage receptacle and a fluid container while the liquid storage receptacle is provided in the refrigerator. The liquid storage receptacle is provided in a docking base for supporting the receptacle in the refrigerator. The dispenser is integrated into the docking base and engages an opening in the receptacle which may be selectively opened by the dispenser.

10 Claims, 16 Drawing Sheets

(56) References Cited

U.S. PATENT DOCUMENTS

| | | | |
|---|---|---|---|
| 4,202,470 A | 5/1980 | Fujii | |
| 5,490,547 A * | 2/1996 | Abadi | B67D 3/0009 |
| | | | 141/82 |
| 5,938,078 A * | 8/1999 | Dorsey | B67D 3/0025 |
| | | | 222/105 |
| 7,658,212 B2 * | 2/2010 | Meuleners | F25D 23/126 |
| | | | 62/391 |
| 8,448,679 B2 * | 5/2013 | Olson | C02F 1/003 |
| | | | 141/237 |
| 9,067,805 B2 * | 6/2015 | Rajan | C02F 1/003 |
| 9,085,453 B2 | 7/2015 | Mcmahan et al. | |
| 9,199,779 B2 | 12/2015 | Zoss et al. | |
| 9,890,029 B2 | 2/2018 | Comsa et al. | |
| 10,077,183 B2 | 9/2018 | Mcmahan et al. | |
| 10,233,070 B2 | 3/2019 | Comsa et al. | |
| 10,519,025 B2 * | 12/2019 | Sakthivel | F25D 23/126 |
| 10,563,909 B2 * | 2/2020 | Scalf | B67D 1/0011 |
| 10,794,628 B2 | 10/2020 | Park et al. | |
| 10,837,698 B2 | 11/2020 | Choy et al. | |
| 10,852,046 B2 * | 12/2020 | Scalf | F25D 23/126 |
| 10,889,484 B2 | 1/2021 | Subramanya et al. | |
| 10,955,187 B2 | 3/2021 | Scalf | |
| 11,215,394 B2 | 1/2022 | Park et al. | |
| 11,619,439 B2 * | 4/2023 | Kwon | F25D 23/028 |
| | | | 62/4 |
| 11,781,805 B2 | 10/2023 | Dhage et al. | |
| 11,821,680 B2 | 11/2023 | Park et al. | |
| 11,982,488 B2 | 5/2024 | Kwon et al. | |
| 2009/0126392 A1 | 5/2009 | An et al. | |
| 2015/0197417 A1 | 7/2015 | Stagg et al. | |
| 2019/0337790 A1 | 11/2019 | Lee | |
| 2021/0396459 A1 | 12/2021 | Kwon et al. | |
| 2024/0044573 A1 | 2/2024 | Park et al. | |
| 2024/0240851 A1 | 7/2024 | Kwon et al. | |

* cited by examiner

REFRIGERATOR WATER DISPENSER

CROSS-REFERENCE TO RELATED APPLICATIONS

This application is a continuation application of U.S. Non-Provisional application Ser. No. 18/636,040, filed Apr. 15, 2024, which claims the benefit and priority under 35 U.S.C. § 119(e) to U.S. Provisional Patent Application No. 63/459,456, filed Apr. 14, 2023; and further claims the benefit and priority under 35 U.S.C. § 119(e) to U.S. Provisional Patent Application No. 63/459,460, filed Apr. 14, 2023, and U.S. Provisional Patent Application No. 63/574,568, filed Apr. 4, 2024, the contents of which are considered part of this application and are hereby incorporated by reference in their entireties.

TECHNICAL FIELD

The present disclosure relates generally to refrigerator water dispensers, and more specifically to high flow rate water dispensers, assemblies, subassemblies, and components thereof.

BACKGROUND

Refrigerators may incorporate water dispensers to dispense chilled water. Conventional systems use line pressure to drive the water flow through small diameter tubes that restrict the water flow rate. Therefore, there exists an opportunity to provide an improved water dispenser that provides a measured quantity of chilled water at a high flow rate.

SUMMARY

One aspect of the disclosure provides a liquid dispensing system for a refrigerator. The refrigerator has a water dispenser for selectively dispensing water. The refrigerator is provided with a pitcher having a pitcher body and a removable lid for engaging with the pitcher body. The pitcher is provided in a docking base for supporting the pitcher in the refrigerator and positioned the pitcher to be automatically filled with water via the water dispenser. A beverage dispenser is integrated into the docking base for dispensing liquid from the pitcher while the pitcher is supported in the docking base. In examples, the beverage dispenser may be engaged by a fluid container such as a glass for opening a fluid channel between the pitcher and the fluid container.

In some examples, the pitcher includes an opening in the bottom of the pitcher. The opening may be provided with a valve for selectively opening and closing the opening. In some examples, the valve may be a spring loaded check valve which may open by being pushed upward to unseat around the opening. In some examples, the opening may be provided on a surface raised above the bottom surface of the pitcher. In some examples, the dispenser may have a conical shape. In some examples, the dispenser may include a narrow tip and a circular bezel. The narrow tip may be provided in a through hole of the docking station and be configured to raise into the valve for opening the fluid channel in the pitcher. The bezel may have an outer edge and a plurality of spoke extending between the round outer edge. In examples, the bezel or the plurality of spokes may be made of an antimicrobial material. In some examples, the dispenser may be raised from a disengaged position to an engaged position. In some examples, an open end of the fluid container may be raised against the bezel to lift the dispenser from the disengaged position to the engaged position.

Another aspect of the disclosure provides a liquid dispenser for integrating into a refrigerator. The liquid dispenser may include a pitcher having a body for storing liquid and a valve integrated into the bottom of the pitcher. A docking station may support the pitcher in the refrigerator. A dispenser is integrated into the docking station and includes a nozzle. In examples, when the nozzle is lifted with a fluid container, the nozzle engaged the valve of the pitcher and releases liquid from the pitcher in the fluid container.

In some examples, the pitcher includes a removable lid. In examples, the lid may include a fill port for engaging a water dispenser in the refrigerator. The water dispenser may automatically fill the pitcher based upon a sensed liquid level in the pitcher. In some examples, the docking station may include a spring configured to initially deform as the pitcher is provided in the docking station. The spring may then expand to its initial size after a user provides the pitcher in the docking station. In examples, the spring may raise and lower the pitcher to align the pitcher under the water dispenser of the refrigerator.

In some examples, the pitcher may include an opening on a raised surface above the bottom of the pitcher. In some examples, the nozzle may include a tip providing in an opening of the docking station. In examples, the tip may be provided to not engage the valve in a disengaged position and to engage the valve in an engaged position. In some examples, the nozzle may include a circular bezel. In examples, the bezel may having a plurality of spokes for engaging the fluid container. In examples, as a user lifts the fluid container into the plurality of spokes, the nozzle is raised and the tip engages the valve to open a fluid channel from the pitcher opening to the fluid container such that liquid may flow from the pitcher and into the container.

Another aspect of the disclosure provides a method of dispensing a liquid in a refrigerator. The method includes providing a liquid storage receptacle in a docking station of a refrigerator. In examples, the liquid storage receptacle is filled with water from a water dispenser of the refrigerator. In some examples, the water dispenser automatically fills the liquid storage receptacle based upon a sensed liquid level in the pitcher. In examples, when a user desires to dispense liquid from the storage receptacle, a fluid container may be lifted into a dispenser nozzle integrated into the docking station. The dispenser nozzle may then engage a valve in the bottom of the liquid storage receptacle to release water from the receptacle into the fluid container. In some examples, the water may be released at a flow rate based upon the upward force of the dispenser nozzle.

The details of one or more implementation of the disclosure are set forth in the accompanying drawings and the description below. Other aspects, advantages, purposes, and feature will be apparent upon review of the following specification in conjunction with the drawings.

BRIEF DESCRIPTION OF THE DRAWINGS

Like reference numerals indicate like parts throughout the drawings.

DETAILED DESCRIPTION

A refrigerator is a household appliance with a refrigeration compartment and in some instances may also have a freezer compartment. The refrigerator may attach to a water source to incorporate a water dispenser at an interior surface of a door enclosing one of the compartments and/or on a wall surface of the refrigeration compartment. Also, a liquid storage compartment, such as a pitcher, may be provided in an interior portion of the refrigeration compartment and/or on a door portion. The refrigerator disclosure herein provides an automatically refilling liquid storage receptacle that engages the water dispenser provided in the interior portion of the refrigeration compartment. The pitcher includes a high flow rate water dispenser to fill a separate fluid container with water from the pitcher while the pitcher remains in the refrigerator.

Figure 1:
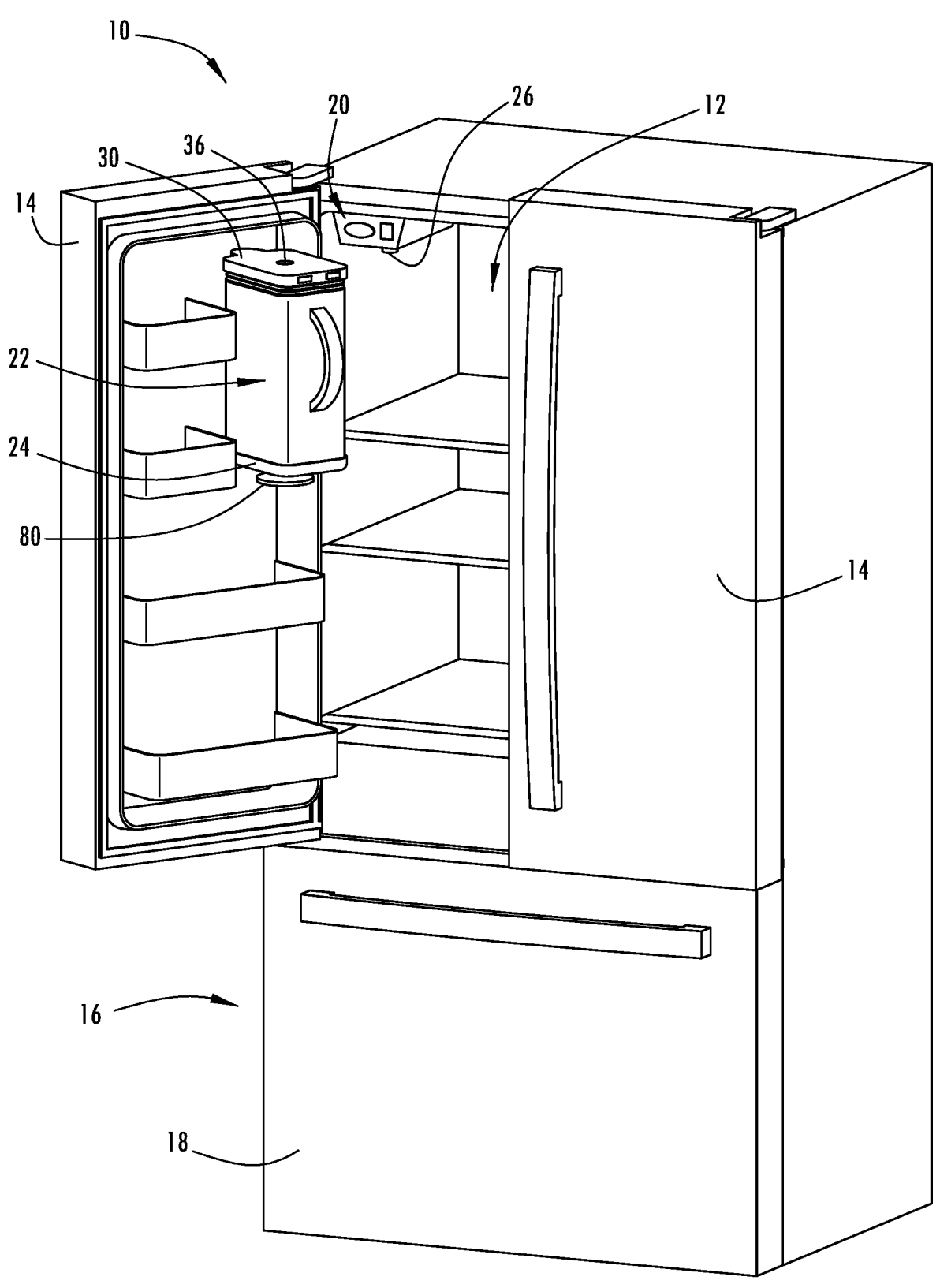
FIG. 1 is a perspective view of a refrigerator with a door open and having a water storage device that includes a water dispenser.

Referring to FIG. 1, an example of a refrigerator 10 is provided, showing a refrigeration cabinet, which may be referred to as a fresh food storage section or fresh-food compartment 12 of the refrigerator 10. The fresh food storage section 12 is enclosed by two front access doors 14 in a French-door configuration which are pivotally mounted to the cabinet. In other examples, the fresh food storage section 12 may have a single door pivotally mounted to the cabinet. The refrigerator 10 also includes a freezer compartment, or a frozen food storage section 16 positioned below the fresh food storage section 12. The frozen food storage section 16 is enclosed by a single access door 18 in a sliding pull-out configuration. In other examples, the refrigerator 10 may be positioned adjacent to the fresh food storage section such that the fresh food storage section and the frozen food storage section are in a French-door configuration. In further examples, the refrigerator 10 may not include a frozen food storage section.

The refrigerator 10 may include an integrated water dispenser 20. The water dispenser 20 is integrated into the fresh food storage section 12, for example, in an interior surface of the fresh food storage section 12. In some examples, the water dispenser 20 may be integrated into the interior surface of the top wall of the fresh-food compartment 12. In other examples, the water dispenser 20 may be integrated in an external surface of an access door 14 to the fresh food storage system 12 or in other various internal walls of the fresh-food compartment. An automatically filing liquid storage receptacle, for example a pitcher, 22 is provided to be stored in the fresh food storage section 12. The pitcher 22 may be configured to interface with the water dispenser 20 when the access door 14 is closed. The pitcher may be automatically filled with water via a system and method such as disclosed in U.S. Provisional Application No. 63/459,456.

The refrigerator 10 includes a docking station 24 configured to support the pitcher 22 in the refrigerator 10. The docking station 24 is provided to ensure proper placement and orientation of the pitcher 22 relative to the water dispenser 20. The docking station 24 may be integrally formed with a support feature or a storage bin on the door 14. In some examples, the pitcher 22 may be sized to contain about one gallon of liquid. In other alternatives, the pitcher may be larger or smaller, and be sized to contain about one-half gallon, one-and-a-half liters, two liters, one-and-a-half gallons, or other suitable sizes. The pitcher 22 may be sized to be integrated into existing refrigerator designs, maintaining clearance from a door dyke, door gaskets and seals, and storage bins including crisper bins and deli/pantry bins.

Figure 2:
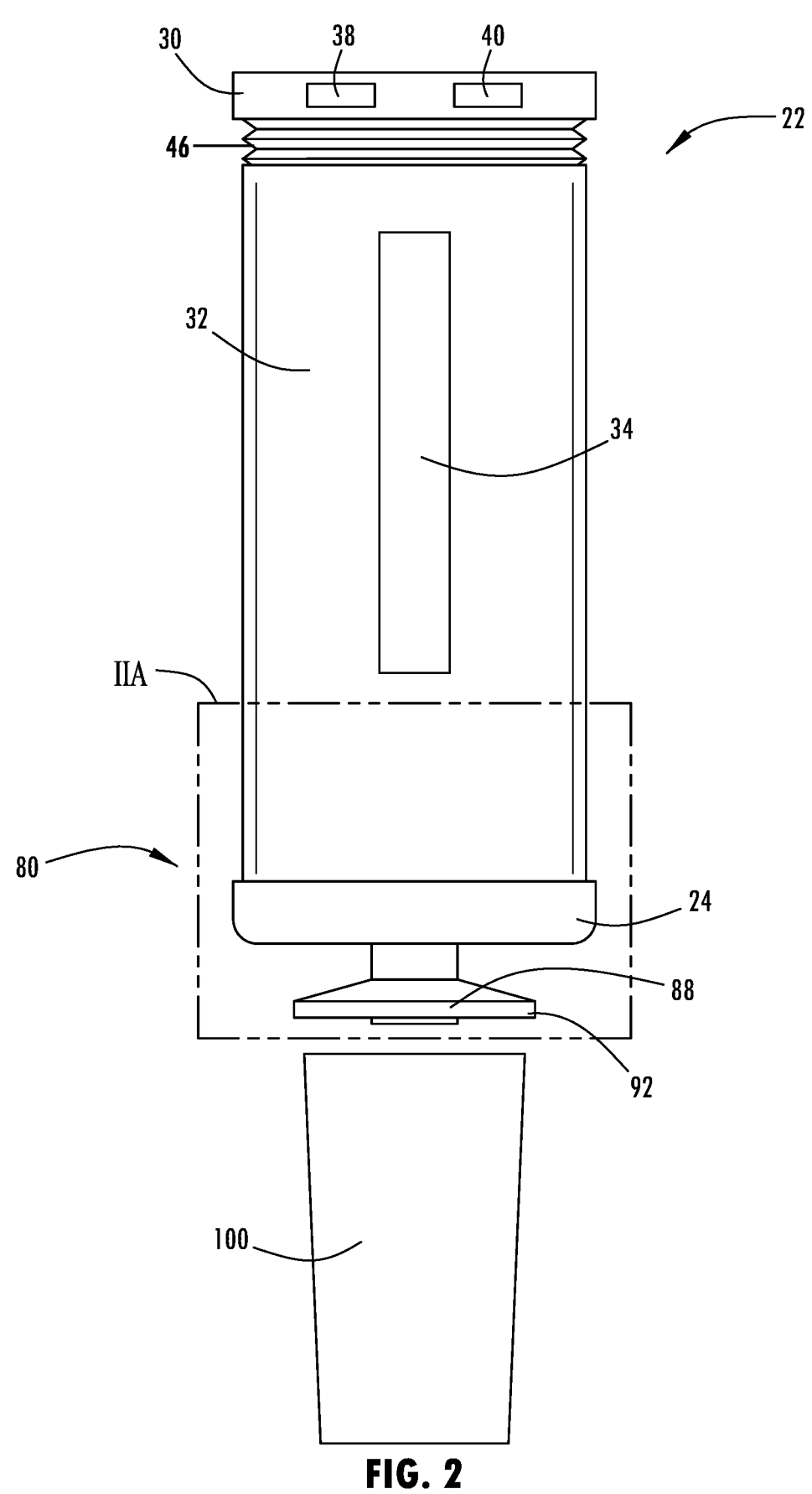
FIG. 2 is a front view of the water storage device shown in FIG. 1.
Figure 2A:
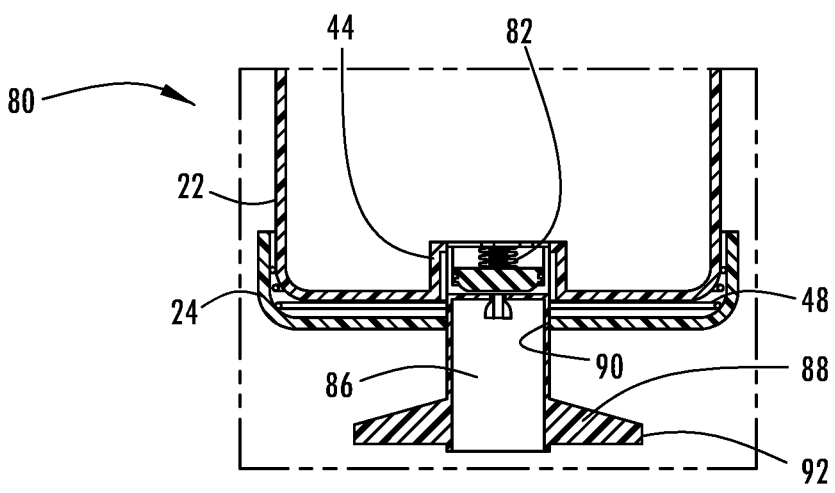
FIG. 2A is a cross-sectional view of a lower section of the water storage device and the water dispenser illustrated in section IIA of FIG. 2.
Figure 2B:
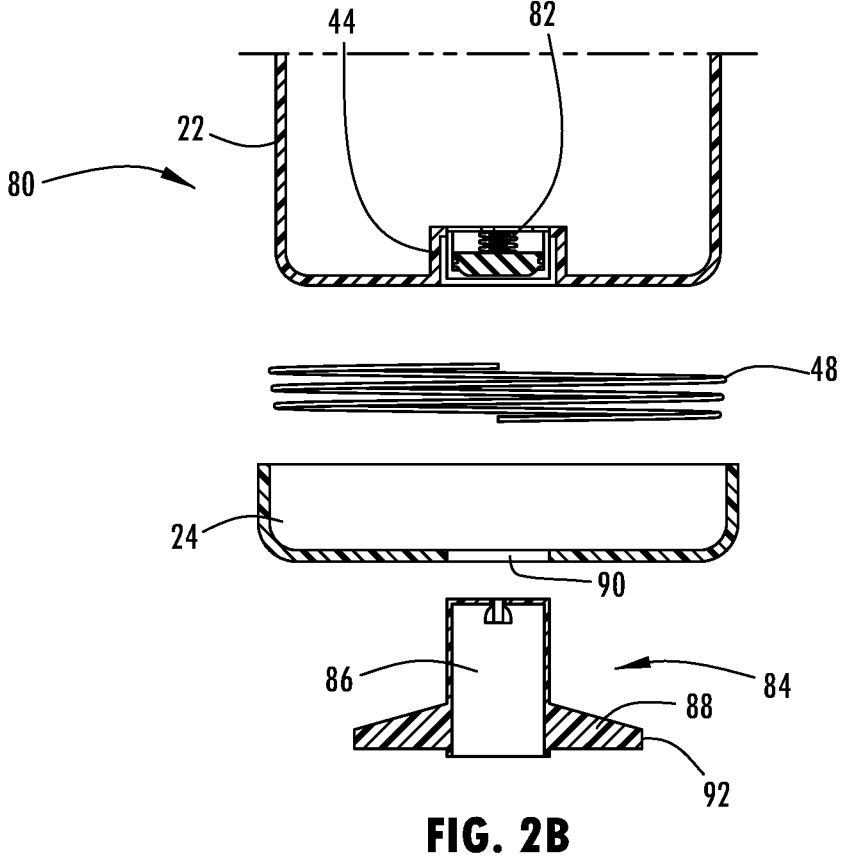
FIG. 2B is an exploded view of the water dispenser shown in FIG. 2A.
Figure 2C:
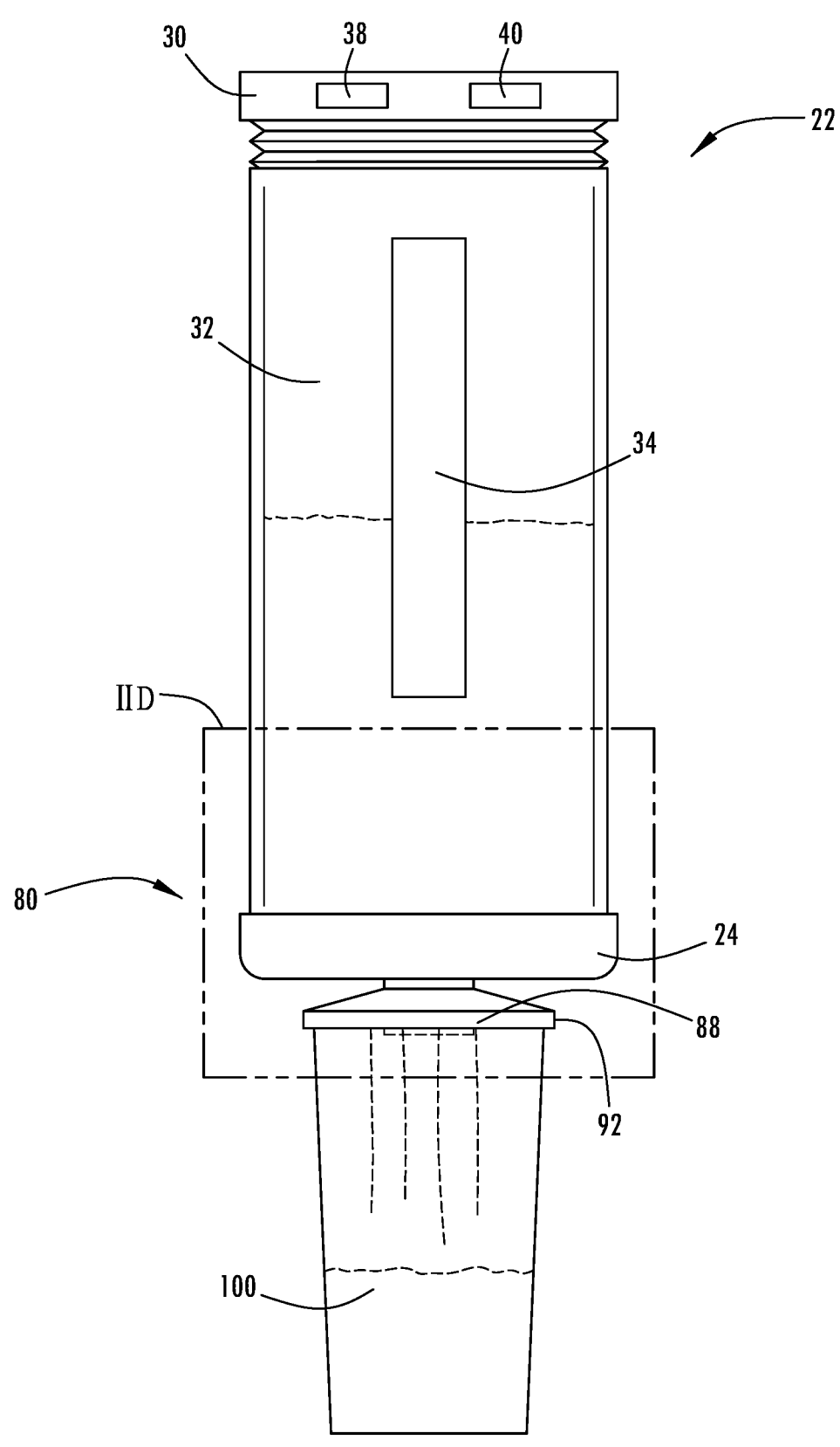
FIG. 2C is a front view of the water storage device shown in FIG. 2 dispensing water into a secondary container with the water dispenser.
Figures 2D, 2E:
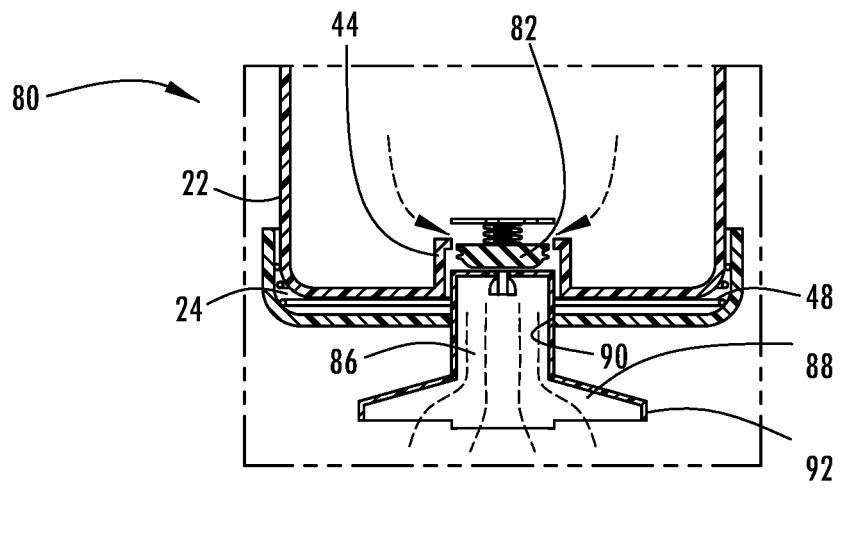
FIG. 2D is a cross-sectional view of the lower section of the water storage device and the water dispenser illustrated in section IID of FIG. 2C.
FIG. 2E is a top view of the nozzle of the water dispenser shown in FIG. 2.

Referring now to FIGS. 2-2E, an exemplary pitcher 22 is provided as positioned in the docking station 24. The pitcher 22 includes a pitcher body 32. A handle 34 may extend from the pitcher body 32 to aid a user in handling the pitcher 22. In some examples, a lid 30 encloses the pitcher body 32 and may incorporate a spout which may be used for aiding in pouring liquid from the pitcher 22 when the pitcher 22 is removed from the docking station 24 and refrigerator 10. A collar 46 may be provided around a top edge of the pitcher body 32 that aids in alignment between the pitcher body 32 and the lid 30. For example, the collar 46 may be a bellows collar. The lid 30 may also be configured to engage the water dispenser 20. For example, as illustrated in FIG. 1, the lid 30 may include a fill port 36 that interfaces with the dispenser nozzle 26 when the access door 14 is closed to automatically fill the pitcher body 32 with water from the water dispenser 20 based upon a sensed liquid level in the pitcher 22. The lid 30 may also include a variety of magnets, contacts, or sensors configured to engage the water dispenser 20 and a control switch 66. For example, the lid 30 may include a proximity magnet or sensor 38 which are configured to determine when the pitcher 22 is docked and aligned with the dispenser nozzle 26. When the pitcher 22 is properly docked and the door 14 is closed, the sensor 38 will sense that the pitcher 22 and fill port 36 are aligned with the dispenser nozzle 26, thus leading to the control switch 66 engaging the water dispenser 20. In other examples, the lid 30 may also include a fluid level sensor 40 or other accessory for sensing the liquid level of the pitcher 22. When the pitcher 22 is properly aligned and then fluid level sensor 40 senses the liquid level in the pitcher is below a high-threshold, the control switch 66 may then engage the water dispenser 20 to dispense water into the pitcher 22. The magnets, contacts, or sensor may be mechanically or electrically coupled to the control switch 66 for determining when the water dispenser 20 should be engaged to automatically fill the pitcher 22 with water. In some examples, a spring 48 may be provided in the docking station 24 to aid in engaging and disengaging the pitcher 22 with the sensors. For example, the spring 48 may be depressed when the pitcher 22 is provided in the docking station 24, such that the pitcher 22 can be positioned under the water dispenser 20. The spring 48 may have an elasticity that allows the spring 48 to thereafter expand to its original size such that pitcher 22 is raised back up to be positioned tightly against the surface of the water dispenser 20 for aiding in alignment.

The pitcher 22 is provided with a beverage dispenser 80 configured to selectively dispense liquid from the pitcher 22 while the pitcher 22 remains docked in the refrigerator 10. Thus, the beverage dispenser 80 allows a user to fill a fluid container 100 with chilled water or another liquid from the pitcher 22 without having to remove the pitcher 22 from its docking station 24 in the refrigerator 10. The pitcher 22 acts as a major reservoir as a higher capacity tank for storing a quantity of water to be chilled within the refrigerator prior to dispensing by a user.

The pitcher 22 may include a valve 82 integrated into the bottom surface of the pitcher 22. For example, the valve 82 may be a spring loaded check valve. The valve 82 is configured to selectively open a passage or opening 42 in the bottom of the pitcher 22. For example, the valve 82 is configured to block the passage 42 in the bottom of the pitcher 22 when the valve 82 is not engaged by the dispenser 80. The valve 82 is configured to unseat from the passage 42 to create a fluid channel between the pitcher 22 and the fluid container 100 and allow water to pass through the passage 42 when the valve 82 is engaged by the dispenser 80. In some examples, the passage 42 may be provided on a surface with raised edges 44 such that the passage 42 and the valve 82 are raised above the interior bottom surface of the pitcher 22. This raised position may result in reducing or preventing the flow of any sediment in the water through the valve 82.

When the pitcher 22 is docked in the docking station 24, the valve 82 is not engaged. Thus, the valve 82 remains closed and liquid remains in the pitcher 22. The docking station 24 is coupled to a dispenser nozzle 84 for use by a user to dispense the liquid in the pitcher 22 to a separate glass or fluid container 100. The dispenser nozzle 84 may extend below the pitcher 22 in a space that is void of additional storage bins or other refrigerator components such that the separate fluid container 100 may be placed in the space directly below the dispenser nozzle 84 to engage the beverage dispenser 80. The dispenser nozzle 84 may be a conical structure having a narrow tip 86 to engage the valve 82 and a bezel 88 having a circular shape to be engaged by the glass or other container 100 by a user. The narrow tip 86 is provided in a through hole 90 of the docking station 24. In a disengaged position, the narrow tip 86 is configured to extend into the through hole without engaging the valve 82. In an engaged position, the narrow tip 86 is configured to extend past the through hole 90 to engage and press into the valve 82. In some examples, the bezel 88 may have an edge 92 having a circumference larger than that of an opening of a generic water glass. As such, the edge 92 can surround or be seated over the edge of the fluid container 100 to reduce a splash of water out of the container 100 as water flows from the pitcher 22 to the container 100. The bezel 88 may be a wire form or plastic molded cone. In some examples, the bezel 88 may be treated with an antimicrobial coating to reduce the possibility of contamination by placing used drinking glasses against the bezel. In some examples, the bezel 88 may have a plurality of spokes 94 extending from the middle of the bezel to the outer edge 92. The spokes 94 may provide a surface for a fluid container 100 to press against regardless of the size of the container opening.

The bezel 88 may also aid a user in engaging the beverage dispenser 80 while reducing the swinging of the access door 14. For example, while a user is providing upward force to engage the beverage dispenser 80, a user may unintentionally provide horizontal forces which may cause the access door 14 to swing. To steady and prevent the swaying of the door 14, in some examples the dispenser nozzle 84 may be provided with a small amount of pivot biased towards the user. Thus, by a user tilting the container 100 slightly towards themselves, the bezel 88 may help balance and neutralize the horizontal force and subsequent swaying of the door.

In operation, a user may lift the fluid container 100 into the dispenser nozzle 84 such that an open end of the fluid container 100 is pushed upward against the bezel 88. In an engaged position, the bezel 88 is lifted and thus the narrow tip 86 engages the valve 82. The valve 82 may become unseated, opening a fluid channel to allow liquid from inside the pitcher body 32 to pass by the valve 82 and exit pitcher 22 into the fluid container 100. In some examples, a user may determine the speed of flow rate out of the pitcher 22 based upon the upward force of the fluid container 100 against the dispenser nozzle 84. For example, a user may provide a smaller amount of upward force to the bezel 88 to open the valve 82 a small amount to provide a slower flow rate of liquid into the fluid container 100. In other examples, the user may desire a faster flow rate of liquid and may then provide a larger amount of upward force to the bezel 88 to open the valve 82 to its maximum height.

Figure 3:
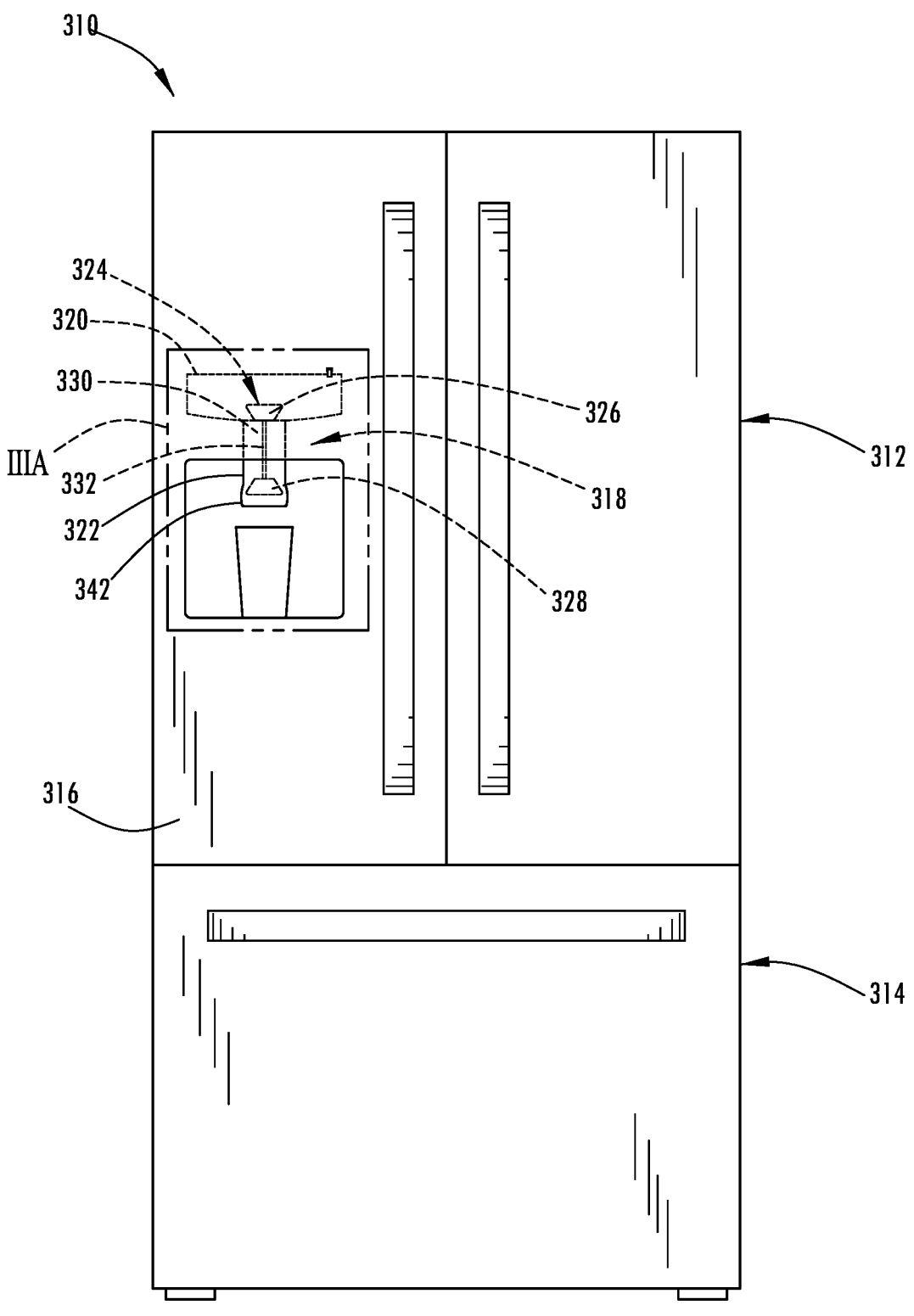
FIG. 3 is a front elevation view of a refrigerator having a water dispenser with a dispensing valve shown in partial cross-section.

Referring to FIG. 3, a schematic front elevation view of a refrigerator 300 is illustrated. The refrigerator 310 includes a fresh food storage section 312 above a freezer section 314. Alternative refrigerator configurations, such as where a freezer section is above or beside a fresh food storage section are within the scope of the present disclosure and the illustration should not be considered limiting. The refrigerator 310 includes an access door 316, which is illustrated as a two-part access door 316 opening from the center for the fresh food storage section 312. Alternative door configurations, such as having a single door opening from one side or the other are likewise within the scope of the present disclosure and the illustration should not be considered limiting. The refrigerator 310 includes a water dispenser 318 integrated into the structure of the access door 316. The water dispenser 318 is illustrated in partial cross-sectional view to assist in conveying the nature of the present disclosure, but in typical implementation, the function components would be hidden from a user by a front panel of the door 316. The water dispenser 318 would be integrated into the door 316 so as to accommodate a fluid receptacle, such as a water glass, to be placed relative to the water dispenser 318 for receiving water dispensed therefrom.

The water dispenser 318 includes a major reservoir 320 as a higher capacity tank for storing a first quantity of water to be chilled within the refrigerator prior to dispensing. The major reservoir 320 may be integrated into the structure of the door 316. The major reservoir 320 may be automatically filled through a fluid connection (not shown) to a water line feed connected to the refrigerator 310. The major reservoir 320 may alternatively or additionally be accessible by a user to manually fill water into the major reservoir 316. The major reservoir 320 may include a lid, access port, or other cover (not shown) for selectively accessing the major reservoir 316 while maintaining the fluid within major reservoir 316 against evaporation into the fresh food storage section 312.

The water dispenser includes a minor reservoir 322 in fluid communication with the major reservoir 320 through a linked valve arrangement 324. The minor reservoir 322 may be a smaller capacity tank for receiving and storing a second quantity of chilled water and for dispensing the water. The linked valve 324 extends from a first end of the minor reservoir 322 with a first stopper 326 to a second end of the minor reservoir 322 with a second stopper 328. The first stopper 326 and the second stopper 328 may be linked together with a stem 332. The first stopper 326 is arranged to selectively open and close a first fluid passage 330 between the major reservoir 320 and the minor reservoir 322. The second stopper 328 is arranged to selectively open and close a second fluid passage from the minor reservoir 322 to a dispensing end 342 of the minor reservoir 322. The stem 332 linking the first stopper 326 to the second stopper 328 is sized so that the first fluid passage 330 is closed when the dispensing end 342 of the minor reservoir 322 is open.

A water receptacle, such as a water glass, may be gravity filled from an automatically refilling water dispenser 318 having two tiers, including a first tier of the major reservoir 320 and a second tier of the minor reservoir 322, gravity fed from the first tier. The major reservoir 320 may have a capacity of between about 1 to about 2 liters, and the minor reservoir 322 may have a capacity of between about 250 milliliters to about 450 milliliters. In one exemplary implementation, the major reservoir 320 has a capacity of 1.2 liters and the minor reservoir has a capacity of 300 milliliters. Using the linked valve arrangement 324 allows the major reservoir 320 to rapidly fill the minor reservoir 322, and upon actuation of the water dispenser 318, allows the minor reservoir to rapidly empty the measured amount stored in the minor reservoir 322 into the water receptacle. Various alternatives and features are described below in connection with the provided figures. Additional modifications, combinations, and substitutions of features from one described or illustrated implementation may be practiced with one or more other described or illustrated implementation without departing from the scope of the present disclosure.

Figure 3A:
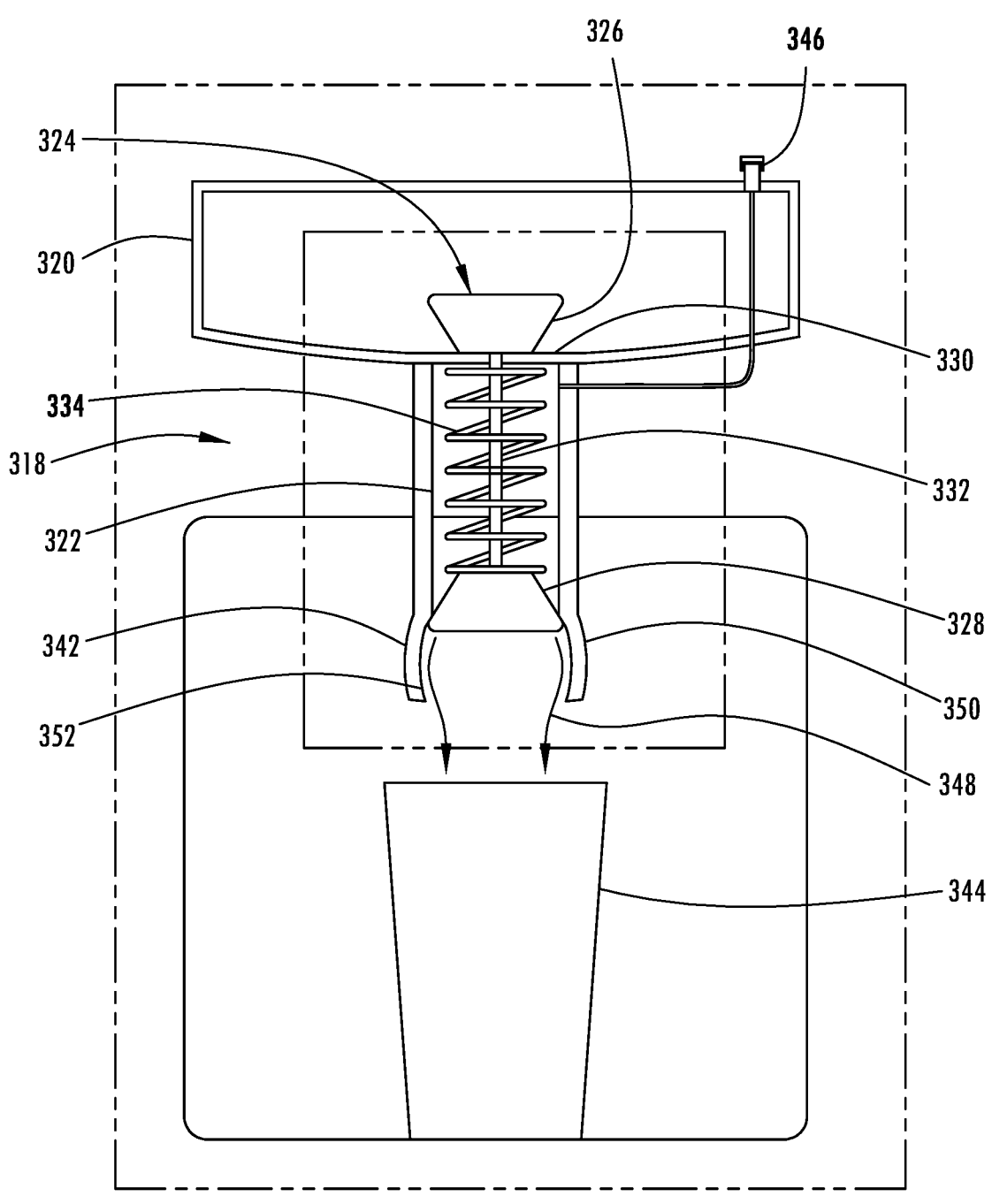
FIG. 3A is a schematic detailed view of the water dispenser of FIG. 3 having a primary reservoir and a secondary reservoir with the dispensing valve shown in partial cross-section.

With reference to FIG. 3A, a water dispenser 318 is illustrated in greater detail in a schematic partial cross-sectional view of a water dispenser 318 for use with a refrigerator 310. The major dispenser 320 is provided at the gravitational top of the water dispenser 318. The minor reservoir 322 is positioned below the major reservoir 320. The linked valve arrangement 324 extends along the minor reservoir 322 between the first end stopper 326 and the second end stopper 328. The first end stopper 326 is arranged to contact and seal a water passage 330 extending between the major reservoir 320 and the minor reservoir 322. The stem 332 links the first end stopper 326 and the second end stopper 328 for coordinated movement thereof. As will be described in additional detail below, a biasing member 334, such as a coil spring, may be provided to bias the linked valve arrangement 324 toward a first position where the dispensing end 342 is closed and the water passage 330 is open. The coil spring may be coiled about the stem 332. A vent 346 may be provided in one or both of the minor reservoir 322 and the major reservoir 320 to prevent a vacuum lock or other default. The second end stopper 328 is arranged to contact and seal a second end of the minor reservoir 322 that constitutes a dispensing end 342 for releasing the fluid stored therein.

The first end stopper 326 and second end stopper 328 may be formed of a rubber or other elastically deformable material to make a water-tight seal against an edge or surface of the water passage 330 and the dispensing end 342. Alternatively, or in addition, the edge or surface of the water passage 330 and the dispensing end 342 may be provided with a rubber or other elastically deformable material, such as an O-ring or the like for making a water-tight seal against the first end stopper 326 and second end stopper 328, respectively. Where the edge or surface of the water passage 330 and the dispensing end 342 is provided with a rubber or other elastically deformable material, such as an O-ring or the like, the first end stopper 326 or the second end stopper 328 may be formed of a rigid material that does not exhibit significant elastic deformation, such as a metal, plastic, ceramic, or other similar material suitable for long-term drinking water exposure. The first end stopper 326 and the second end stopper may be shaped to correspond with the shape of the opening at the water passage 330 and the dispensing end 342 to make a water-tight seal. In one example, the water passage 330 and the dispensing end 342 include a circular shape and the first end stopper 326 and the second end stopper 328 are formed in a circular, conical shape to seal against the corresponding edge of the water passage 330 and the dispensing end 342. However, this is not intended to be limiting, and moreover, the size, shape, material or arrangement for the first end stopper 326 and the water passage 330 may be different from the second end stopper 328 and the dispensing end 342.

The dispensing end 342 may be shaped to facilitate a high flow rate of fluid out of the minor reservoir 322 while minimizing the potential splash-back from fluid hitting a surface of a water receptacle 344. In one example, the dispensing end 342 includes a substantially spherical opening that includes a flared potion 350 open toward the minor reservoir 322 and a constricted portion 352 open opposite the minor reservoir 322 to create a constricting ring or cone of water having a horizontal component to the direction of travel. As the water flow 348 exits the dispensing end, the different portions of the ring of water may collide and scatter within the fluid receptacle 344 and thus minimize the amount of splash back that would otherwise be observed from a direct jet of water, such as may be found from a line-pressure water dispenser.

Figures 4, 5:
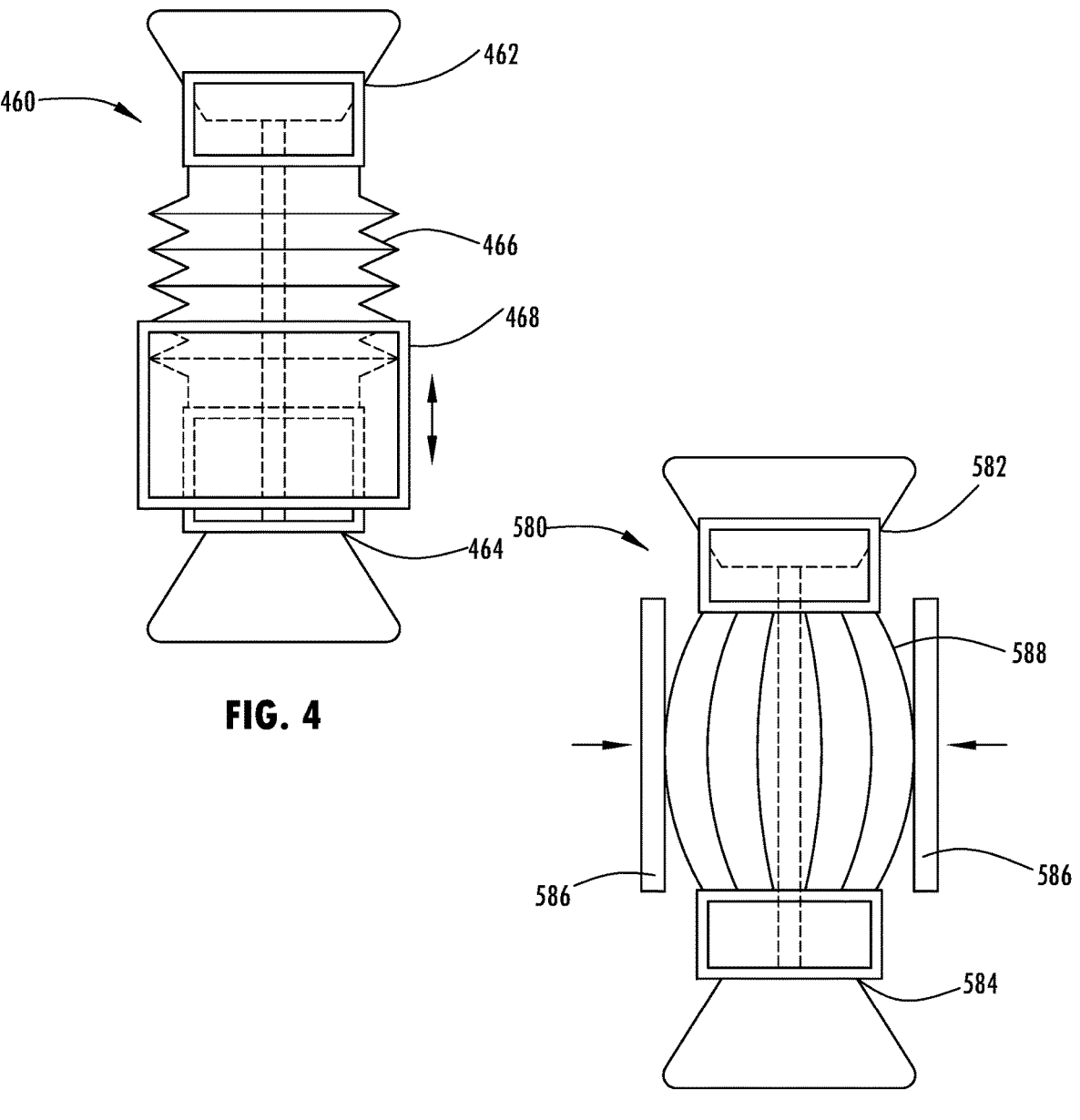
FIG. 4 is a schematic partial cross-sectional view of a dispensing valve shown in a first configuration.
FIG. 5 is a schematic partial cross-sectional view of a dispensing valve in a second configuration.

The minor reservoir 322 may provide a static volume of fluid capacity, as illustrated in FIGS. 3 and 3A, but a user may desire to adjust the volume of fluid dispensed in a single actuation of the water dispenser 318. Referring to FIGS. 4 and 5, alternative minor reservoirs 460, 580 are illustrated having means for adjusting the volume of water capable of being stored therein. In a first exemplary implementation, minor reservoir 460, illustrated in FIG. 4, includes a similar water passage 462 to the major reservoir and a dispensing end 464 between which extends a linked valve arrangement 324. The main body defining the minor reservoir 460 may be formed of a flexible material in a folded accordion, gusset, or bellows-like arrangement 466 limited by a selectively positionable sleeve 468 that may be translated along the minor reservoir 460 by a sliding or screwing motion. The sleeve 468 may circumscribe the minor reservoir 322 to compress portions of the folded arrangement 466 to prevent it from otherwise taking in fluid that would be received absent the sleeve 468. The adjustment actuation may be by a cam rotation, screw drive motion, lever positioning or other similar user control accomplished manually, or via electromechanical control. Irrespective of the user-selected volume adjustment, the ultimate distance between the water passage 462 to the major reservoir and the dispensing end remains constant so that the action of the linked valve arrangement 324 is not changed.

Referring to FIG. 5, an exemplary implementation of a minor reservoir 580 is illustrated with the flexible body including a folded arrangement restricted between adjustable platens as side walls adjacent the minor reservoir 580. The minor reservoir may be likewise limited from font to back with static structures forming the refrigerator door 316. User controls may be provided in the form of a cam rotation, screw drive motion, lever positioning or other similar control to selectively adjust the minor reservoir 580 and thus the water volume being dispensed. Where the linked valve arrangement 324 is normally in a default position with the volute of the minor reservoir 460, 580 open to the major reservoir 320 for free fluid communication, adjustment of the minor reservoir volume is readily accommodated by forcing the water upward from the minor reservoir 460, 580 into the major reservoir 320 when the volume is adjusted smaller or allowing additional water inflow when the volume is adjusted larger. The range of adjustment may be dictated by the specific implementation of the water dispenser 318 and may adjust the volume by between 40 and 60 milliliters. In other alternatives, the range of adjustment may allow a volume change in the minor reservoir 460, 580 by between 100 and 200 milliliters.

The water dispenser 310 provides a volume-limited dispensing of fluid at a high flow rate. As described above, the linked valve arrangement 324 may be selectively moved between a first position where the minor reservoir 322 is closed and there is free fluid flow from the major reservoir 320 into the minor reservoir 322 and a second position where the water passage 330 between the major reservoir 320 and the minor reservoir 322 is closed and the dispensing end 342 of the minor reservoir 322 is open to release the water stored therein.

Figures 6A, 6B:
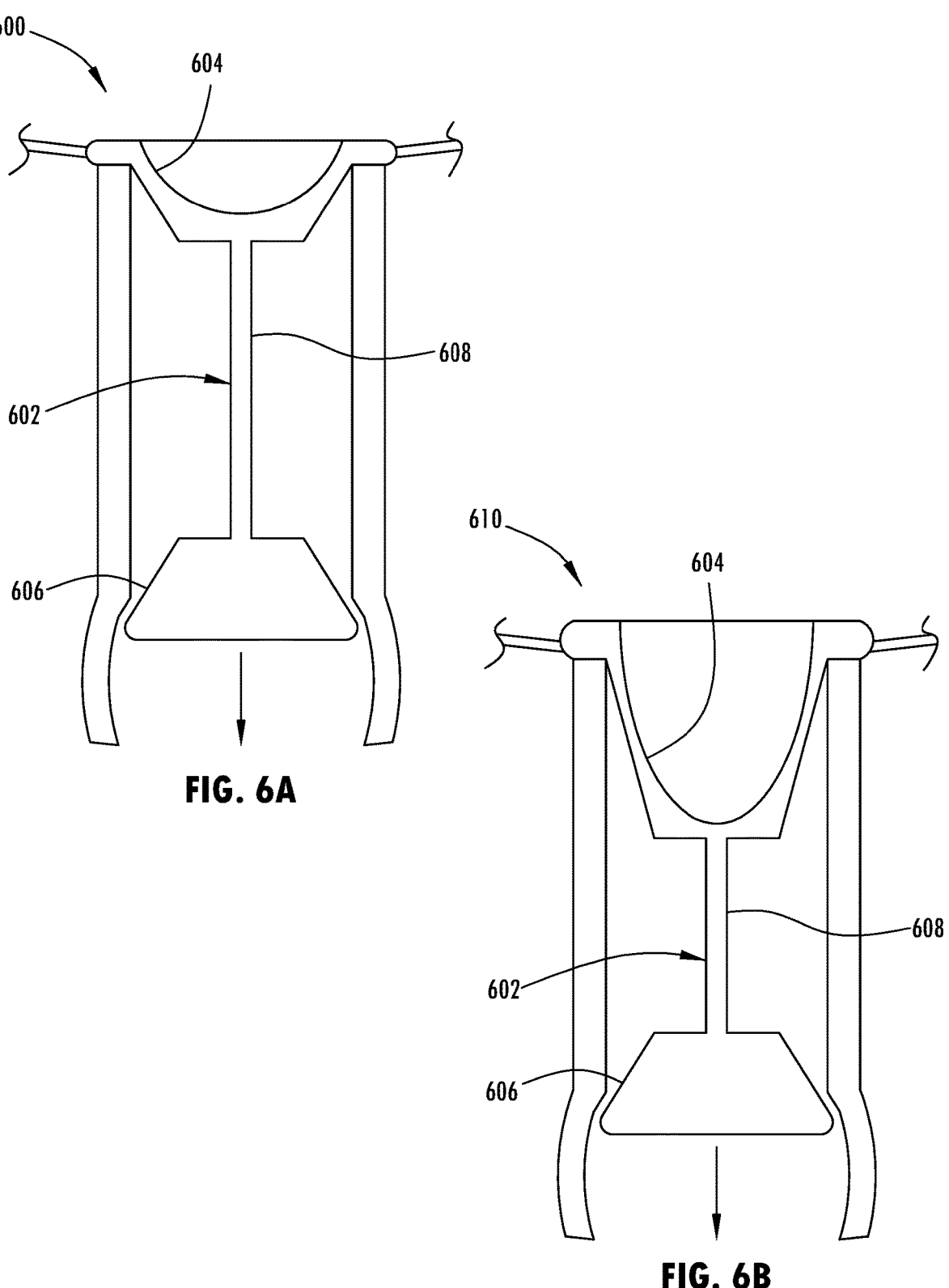
FIG. 6A is a schematic partial cross-sectional view of a dispensing valve in a third configuration.
FIG. 6B is a schematic partial cross-sectional view of the dispensing valve shown in FIG. 6A in an extended position.

Referring now to FIGS. 6A and 6B, a linked valve arrangement 602 is illustrated in a first condition 600 and a second condition 610 respectively. In the second position 610, where the dispensing end is open, the water dispenser may provide the user with flow rate control for increase dispensing flow rate. In one exemplary implementation, the first end stopper 604 may be formed of an elastomeric material, such as santoprene, to allow stretching and elongation of the first end stopper 604 where the second end stopper 606 moves an additional amount in the dispensing end to further increase the effective cross-section of the fluid flow pathway and thereby achieve higher dispensing flow rate. The first end stopper 604 may be formed as a hollow cone such that the walls elongate when put in tension by a dispenser control and allow the second end stopper 606 to move further into a spherical interior portion of the dispensing end of the minor reservoir. In other implementations, the stem 608 may be formed of an elastomeric material to achieve a similar result. As described in more detail below, the user may be provided with a dispensing control such that applying a first force input level against the dispensing control achieves the first dispensing position 600, as shown in FIG. 6A, and applying an increase force input level against the dispensing control achieves the second dispensing position 610, as shown in FIG. 6B. The dispensing control and the linked valve arrangement may be linearly correlated such that increasing levels of input force against the dispensing control achieves similarly increasing levels of dispensing flow rate up to a maximum, such as where the dispensing control reaches a mechanical limit of the water dispenser or refrigerator structure.

Figure 7:
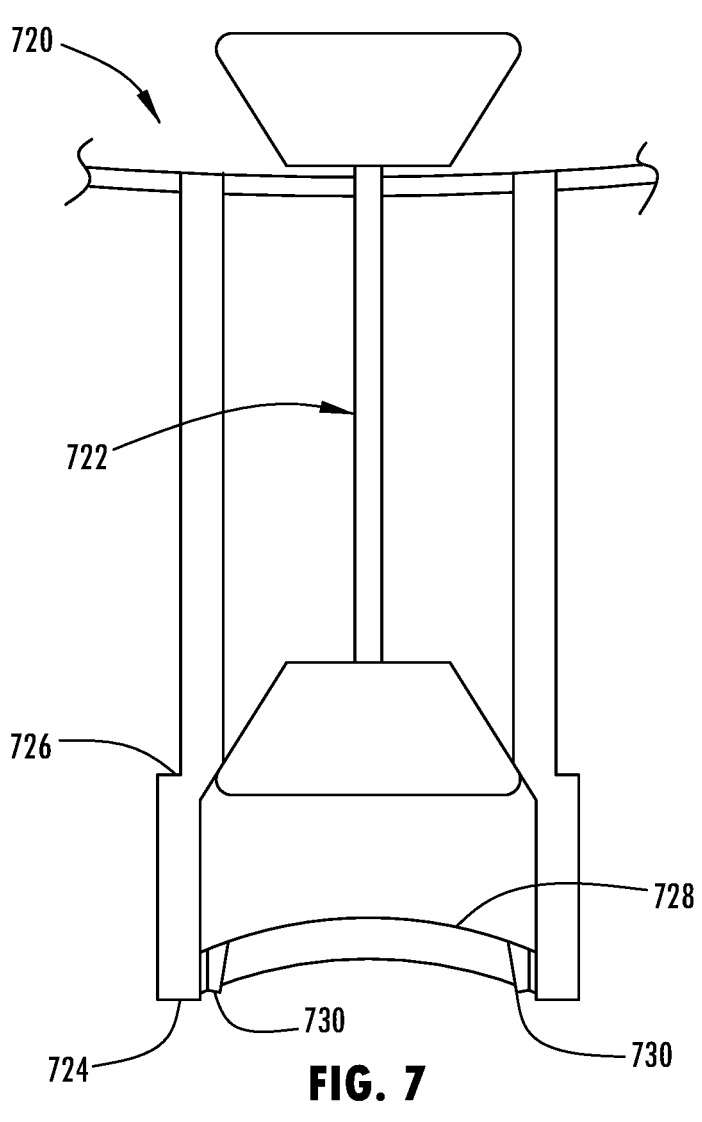
FIG. 7 is a schematic partial cross-sectional view of an alternative exemplary dispensing valve arrangement.
Figure 7A:
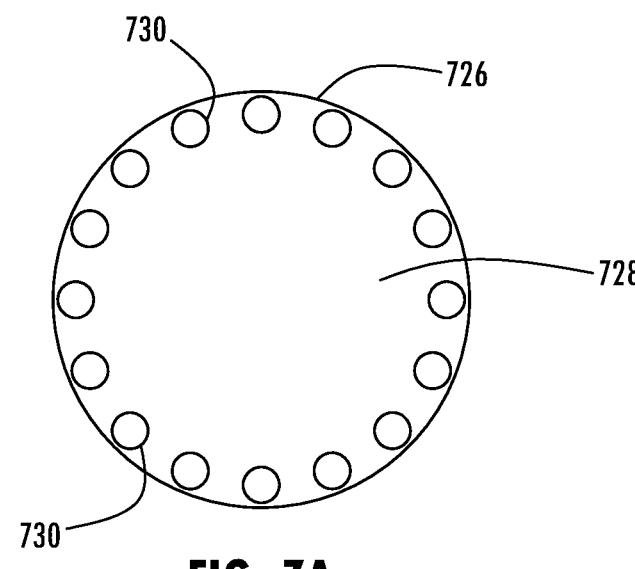
FIG. 7A is an end view of the alternative exemplary dispensing valve arrangement shown in FIG. 7.

The dispensing end of the minor reservoir may be arranged for high flow rate while controlling flow direction to minimize splash back from the water receptacle. Specifically, the dispensing end may be arranged to impart a horizontal flow direction to the gravity-driven out flow from the minor reservoir. Referring to FIGS. 7, 7A, 8 and 8A, exemplary implementations of minor reservoir dispensing ends are illustrated. As shown in FIGS. 7 and 7A, a minor reservoir 720 is illustrated with a stepped tube 726 and nozzle plate 728, rather than the spherical opening of the minor reservoir. The stepped tube 726 and nozzle plate 728 can act similar to a faucet aerator to govern, orient, and break-up the flow stream allowing for a more laminar-like flow with holes 730 positioned and oriented to direct multiple flow streams, creating a cone of flow with a horizontal component so as to impact the wall of the water receptacle with diminished vertical fluid momentum and thus reduced rebound splashing. The nozzle plate 728 may be convex to induce water toward the outer perimeter and avoid pooling between the second end stopper and the nozzle plate 7128. In other alternative implementations, the nozzle plate 728 may include more or fewer holes 730, smaller or larger holes 730, or a distributed pattern of holes encompassing and a greater proportion of the nozzle plate 728, and including central locations.

Figure 8:
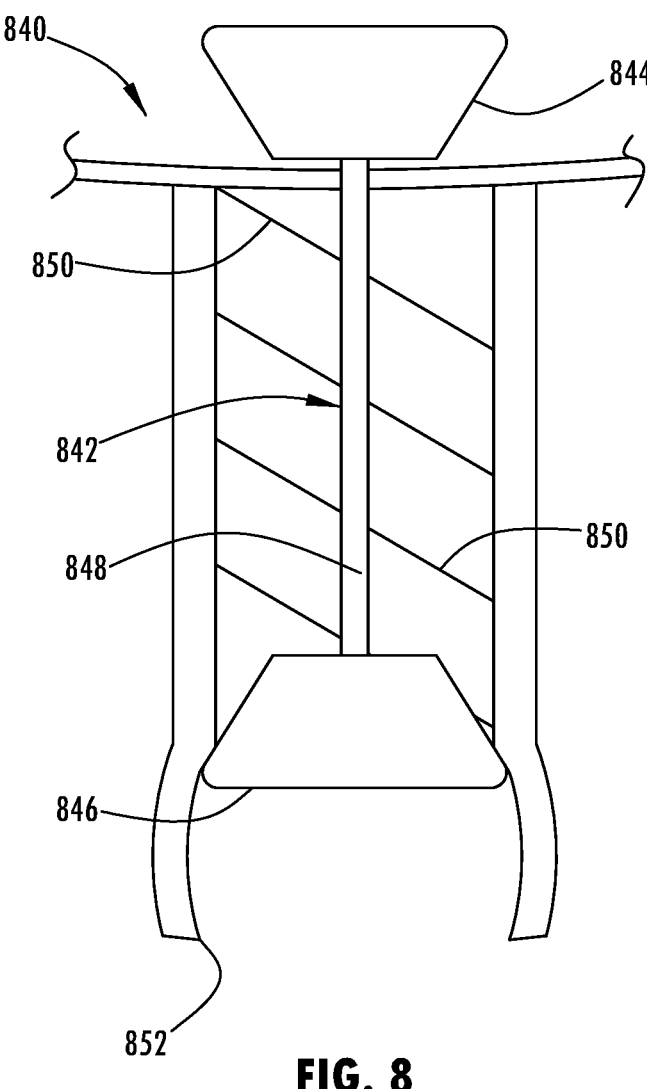
FIG. 8 is a schematic partial cross-sectional view of an alternative exemplary dispensing valve arrangement.
Figure 8A:
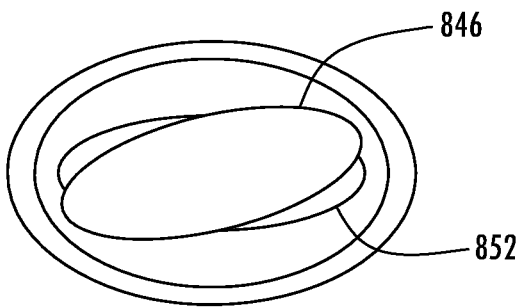
FIG. 8A is an end view of the alternative exemplary dispensing valve arrangement shown in FIG. 8.

Another exemplary implementation of a minor reservoir 840 with a linked valve arrangement 842 including a first end stopper 844, second end stopper 846 and stem 848, is illustrated in FIGS. 8 and 8A. The interior surface of the minor reservoir 840 is provided with flutes 850 arranged in a spiraling pattern. The flutes 850 direct the water in a spiraling pattern to impart the horizontal component to the fluid flow direction in aiding to minimize splash back. The cross-sectional aspect of the minor reservoir 840 and a correspondingly shaped second end stopper 846 may be of an elliptical shape, rather than a circular shape as in the prior described implementations. The assembly of the linked valve arrangement 842 to the minor reservoir 840 may impart a torsional stress to the stem 848 so that as the linked valve arrangement is moved from the first, closed, position to the second, dispensing position, the second end stopper 846 rotates with respect to the minor reservoir 840 in additional to moving linearly with respect to the minor reservoir. This rotational motion of the second end stopper 846 in minor reservoir 840 having an elliptical shaped dispensing end 852 achieves a greater degree of opening in the dispensing end for a smaller amount of translational movement of the second end stopper 846 relative to the minor reservoir 840. The second end stopper 846 may further be provided with complementary flutes to impart additional horizontal flow momentum to the dispensing fluid.

Figure 9:
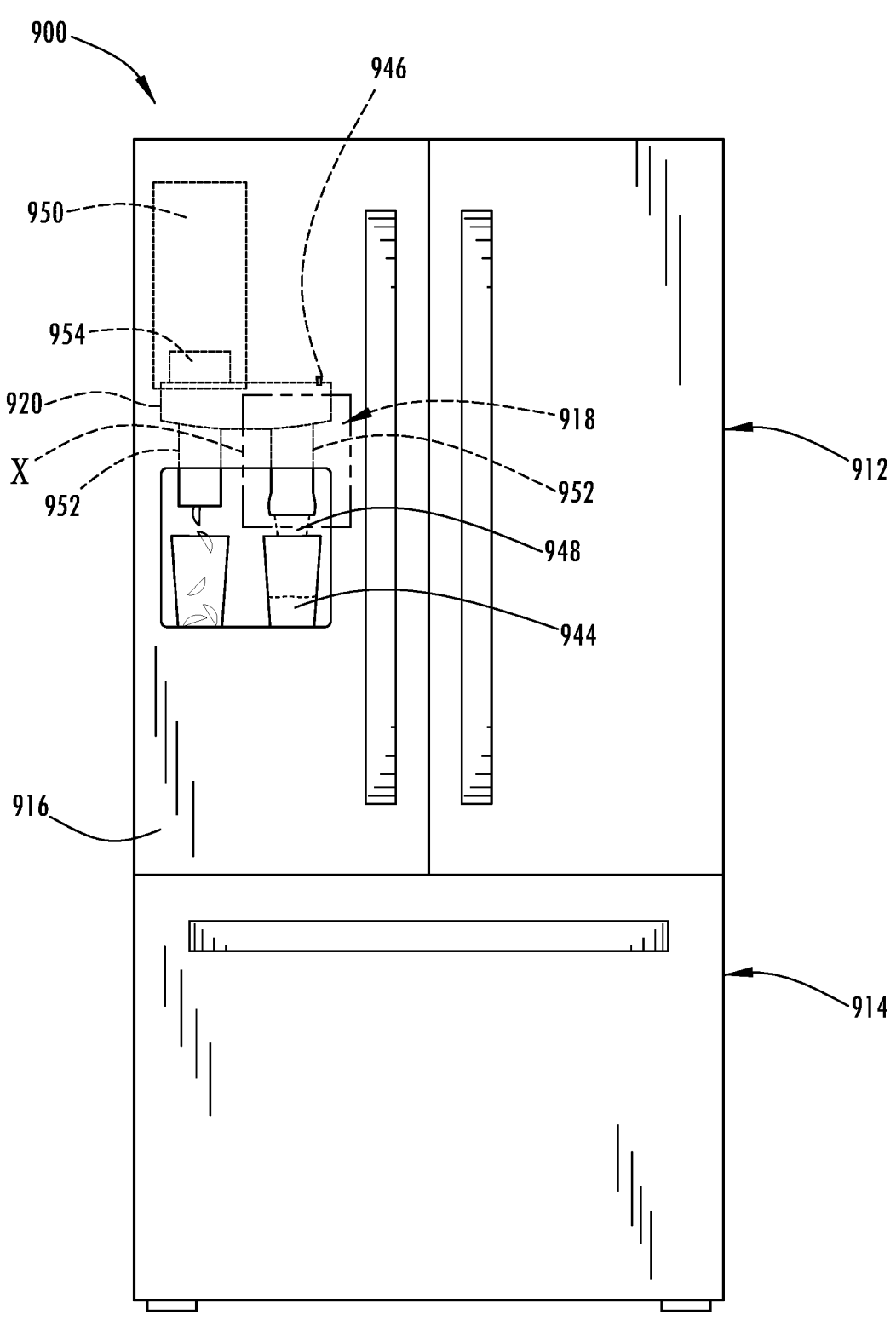
FIG. 9 is a schematic front elevation view of a refrigerator having a combination ice and water dispenser with a dispensing valve shown in partial cross section.

Referring now to FIG. 9, a refrigerator 900 is illustrated including a combinations ice and water dispenser 918 integrated to an access door 916 in the fresh food storage section. While a water dispenser 318, as illustrated in FIG. 3, may dispense chilled water at the temperature of the fresh food storage section 312 of refrigerator 310, this may not be sufficiently chilled to satisfy all users. Therefore, it may be desirable to integrate a water dispenser with an ice dispenser for additional chilling effect. The combination dispenser 918 may include two separate dispensing controls to allows the user to selectively dispense ice and water.

The proximity of the ice maker and ice dispenser to the water dispenser allows an additional ice dispenser door 954 to be provided to dispense ice directed into a major reservoir 920 portion of the combination dispenser 918. The combination dispenser may be provided with a user control to allow the user to manually direct the ice to be dispensed into the major reservoir 920. Alternatively, the combinations dispenser may be provided with an electronic controller and sensor, including control circuitry, such that when a sensed temperature of water in the major reservoir 920 is above a threshold limit, an ice auger or other mechanism is arranged to dispense ice into the major reservoir 920. There may further be a water level sensor arranged to sense a water level in the major reservoir 920 to prevent additional ice from being dispensed that would cause an overflow of the major reservoir 920.

Figure 10:
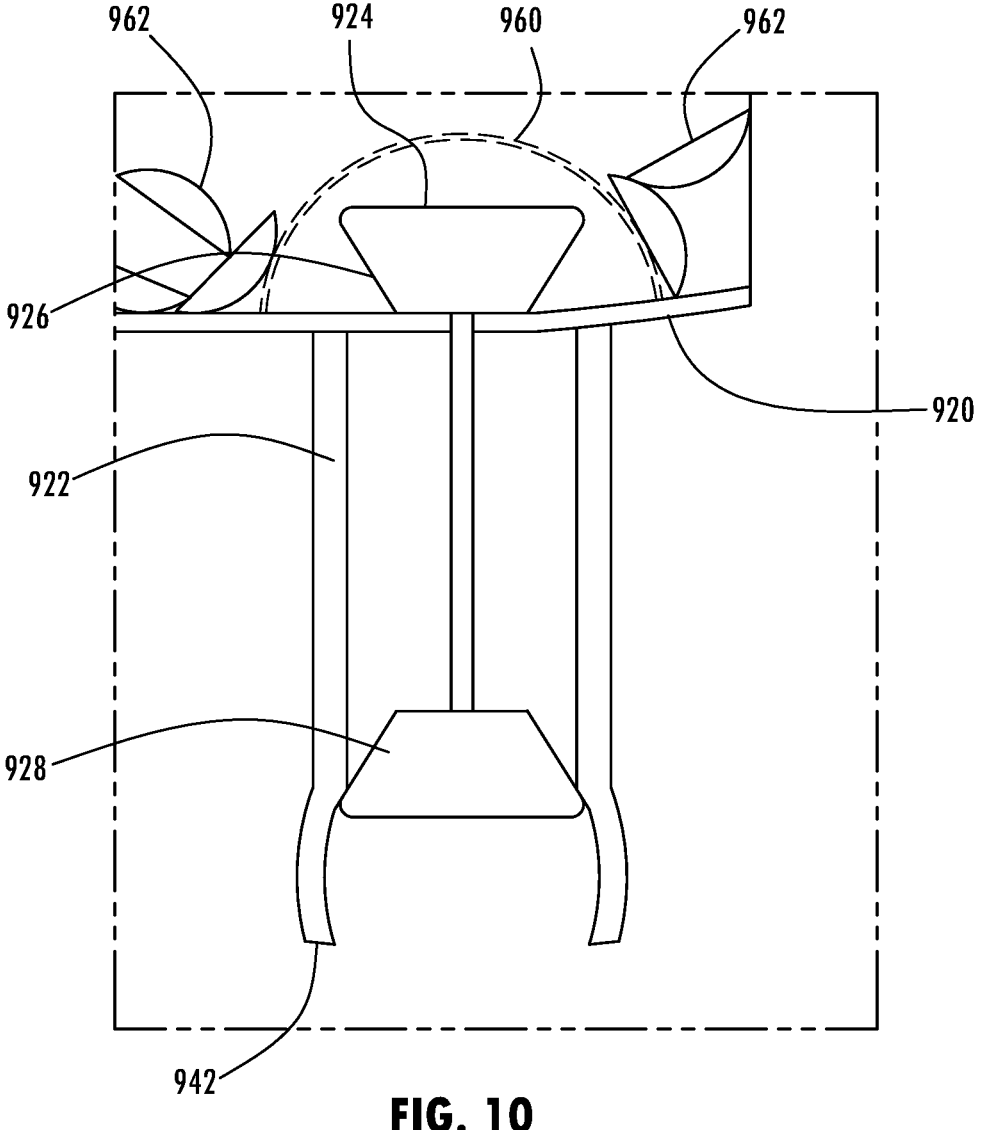
FIG. 10 is schematic detail view of the water dispenser of FIG. 9 having a primary reservoir and a secondary reservoir with the dispensing valve shown in partial cross-section and with a mesh ice shield.

To prevent ice from building up in the minor reservoir 922, reducing the volume of dispensed fluid or inhibiting the mechanical function of the linked valve arrangement 924, an ice shield 960 may be provided at the water passage 930 between the major reservoir 920 and the minor reservoir 922. The ice shield 960 may comprise a removable perforated or mesh dome overarching or otherwise surrounding the water passage 930. This arrangement is illustrated in FIG. 10.

Figures 11A, 11B:
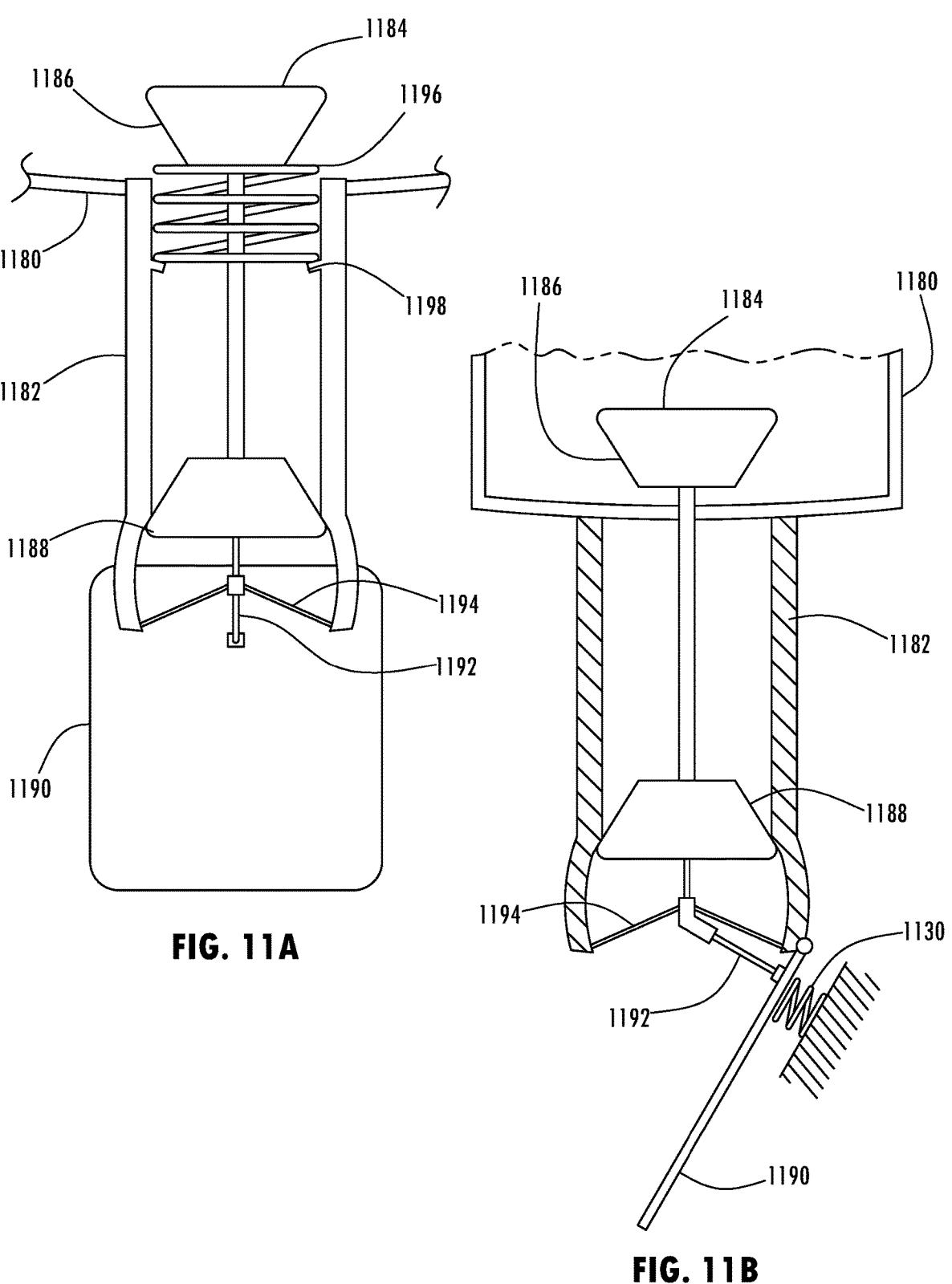
FIG. 11A is a schematic partial cross-sectional view of a control mechanism for actuating a water dispenser.
FIG. 11B is a schematic partial cross-sectional view of a control mechanism for actuating a water dispenser.
Figure 12:
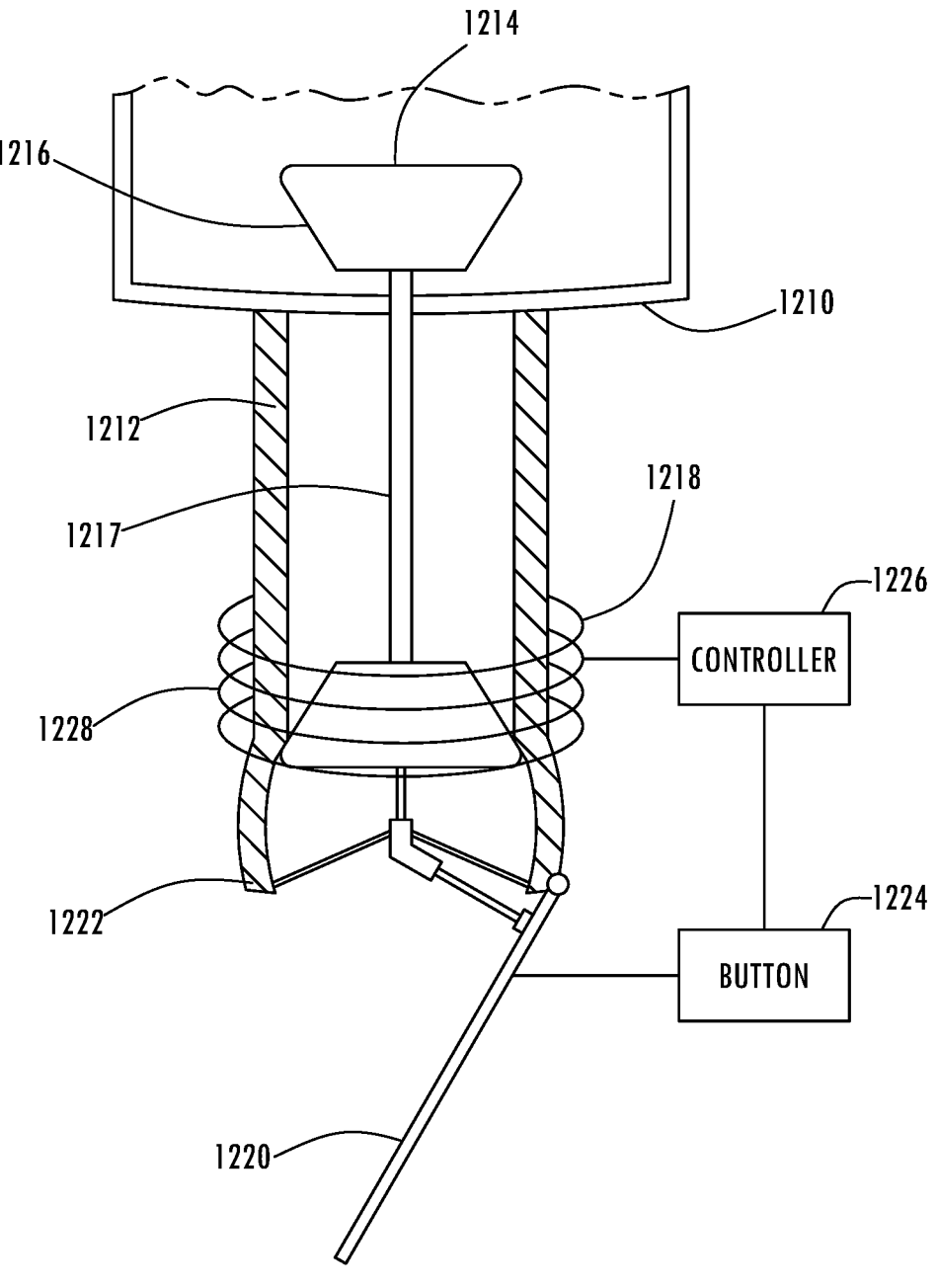
FIG. 12 is a schematic partial cross-sectional view of an alternative exemplary control mechanism for actuating a water dispenser.
Figure 13:
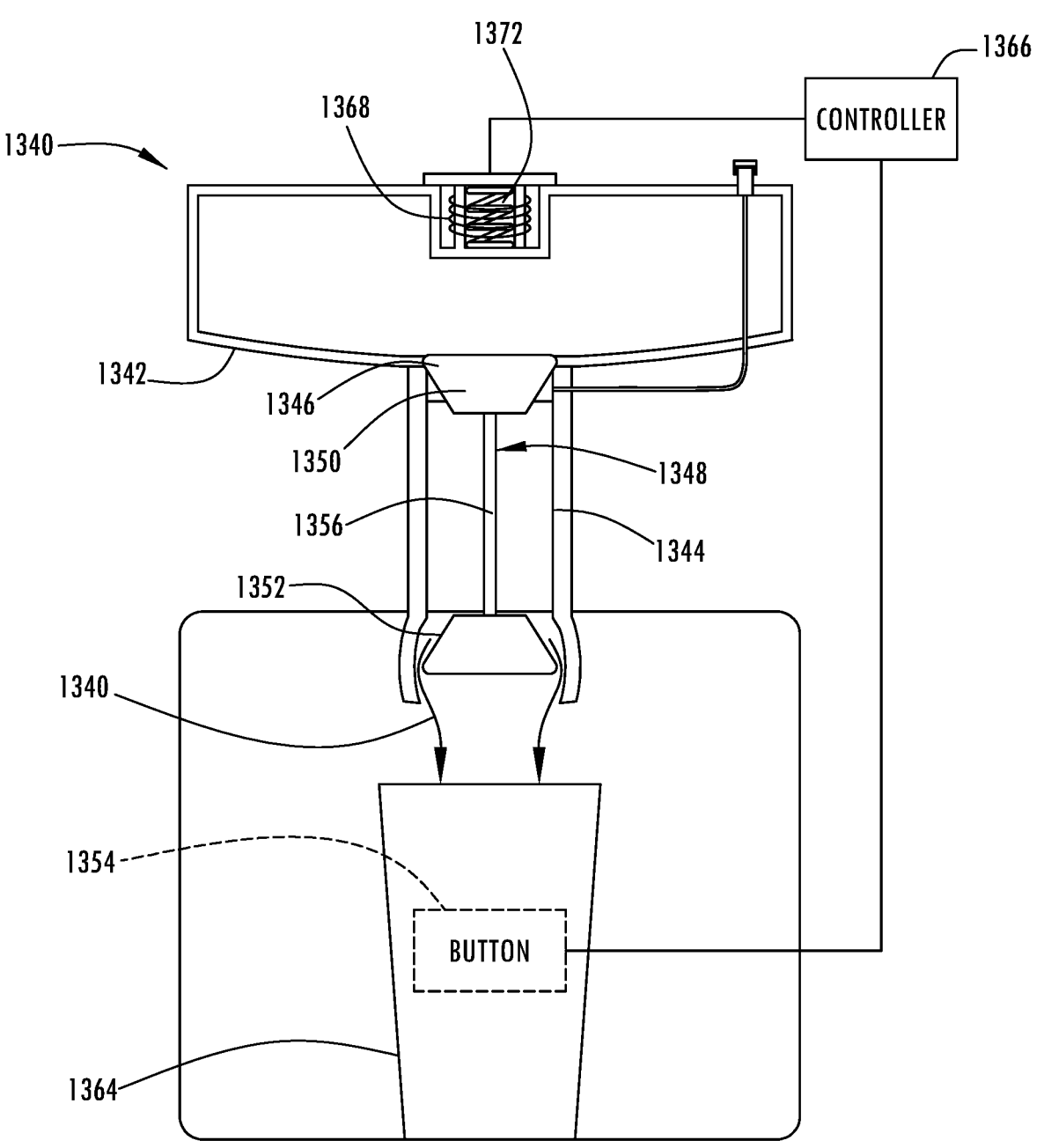
FIG. 13 is a schematic detailed view of an alternative exemplary water dispenser having a primary reservoir and a secondary reservoir with the dispensing valve shown and actuating mechanism in partial cross-section.

Referring now to FIGS. 11-13, exemplary illustrations of user controls for actuating a water dispenser of the present disclosure are provided. The user control may additionally take other mechanical or electromechanical implementations without departing from the scope of the present disclosure. Representative examples of a user control may include a lever, a paddle, a dial, a slide, a button, a rocker, or a switch, such as a toggle switch, a pressure switch, a proximity switch, an optoelectronic switch, or other suitable control. A first exemplary implementation is illustrated in FIGS. 11A and 11B, where a major reservoir 1180 is provided above a minor reservoir 1182. A linked valve arrangement 1184 is provided in the minor reservoir 1182 extending from a first end stopper 1186 to a second end stopper 1188. An actuator 1190 in the form of a paddle is positioned below the minor reservoir 1182 for actuation by a user holding a water receptacle. The actuator 1190 may be supported by a linkage arrangement 1192 for displacement between a first position where the dispenser is inactive and a second position for dispensing the volume of fluid then present in the minor reservoir 1182. A biasing spring 1196 may be provided within the minor reservoir 1182 for urging the linked valve arrangement 1184, and thus the actuator 1190 toward the first position. The minor reservoir 1182 may include an internal feature 1198 for supporting and resisting the biasing spring 1196. Alternatively, or in addition, a biasing spring 1130 may be provided between the actuator 1190 and a refrigerator door 316, 916, into which the water dispenser is integrated. The biasing spring 1130 may similarly be arranged to urge the actuator 1190 and thus the linked valve arrangement 1184 toward the first position.

The user control of the water dispenser may be purely mechanical or may be electronically controlled. In one exemplary implementation illustrated in FIG. 12, a major reservoir 1210 is provided above the minor reservoir 1212 in which a linked valve arrangement 1214 is positioned, the linked valve arrangement 1214 including a first end stopper 1216 and a second end stopper 1218 connected by a stem 1217. An actuator 1220 is pivotally linked to the dispensing end 1222 of the minor reservoir 1212. A position of the actuator is sensed directly or indirectly, or otherwise functionally linked to a button 1224 in electronic communication with a controller 1226. The controller 1226 receives as an input the signal from the sensor or button 1224 and generates an actuation signal to control a solenoid or electromechanical actuator 1228 in communication with and configured to control the position of the linked valve arrangement 1214. The stem 1217 may encase a ferromagnetic material for interface and control by the solenoid or electromagnetic controller 1228.

A water dispenser 1340 is illustrated in a schematic partial cross-sectional view in FIG. 13, including a major reservoir 1342 and a minor reservoir 1344 below the major reservoir 1342. The major reservoir 1342 is arranged to fill water to the minor reservoir 1344 via gravity driven flow through a water passage 1346. A linked valve arrangement 1348 extends through the minor reservoir 1344 from a first end stopper 1350 arranged to selectively close the water passage 1346 to a second end stopper 1352 arranged to selectively close a dispensing end 1354 of the minor reservoir 1344. The first end stopper 1350 and second end stopper 1352 are coupled together by stem 1356 for coordinated movement between a first position with the first end stopper 1350 opening the water passage 1346 and the second end stopper 1352 closing the dispensing end 1354, to a second position with the first end stopper 1350 closing the water passage 1346 and the second end stopper 1352 closing the dispensing end 1354. The movement of the linked valve arrangement 1348 between the first position and the second position may be controlled electronically.

The water dispenser 1340 may include an actuator 1362, such as a button or switch, arranged to be actuated by the presence of a user's hand or a water receptacle 1364, such as a water glass or other beverage container. The actuator 1362 is in electronic communication with a controller 1366 arranged to receive an actuation signal generated by or representative of an actuation state of the actuator 1362. The controller may generate a control signal in response to the actuation signal and transmit the control signal to a solenoid or other electromechanical actuator 1368. The solenoid or other electromechanical actuator 1368 may cooperate with an extension 1370 of the stem 1356 that extends beyond the first end stopper 1350 to a top portion of the major reservoir 1342. A biasing element 1372, such as a coil spring, may be arranged to urge the extension 1370, and thus the linked valve arrangement 1348 toward the first position absent a force imparted by the solenoid or other electromechanical actuator 1368. The electromechanical actuator 1368 may include a magnetic latching solenoid, a low voltage stepper or synchronous motor, or other suitable device.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A refrigerator having a liquid dispensing system, the refrigerator comprising:

a cabinet having a fresh-food compartment;

a door pivotally mounted to the cabinet for providing a user access to the fresh-food compartment;

a pitcher having a body for storing liquid;

a docking station coupled to the cabinet or the door for supporting the pitcher in the fresh-food compartment;

a dispenser coupled to the docking station;

a spring coupled to the docking station to aid the pitcher to engage with at least one sensor; and a water line disposed in the cabinet and extending to the docking station for filling the pitcher with water when the pitcher is located in the docking station, wherein the pitcher comprises a valve disposed at a bottom portion of the body of the pitcher that is configured to be actuated by the user when the pitcher is located in the docking station to dispense the liquid from the pitcher via the dispenser into a fluid container held by the user, wherein the dispenser comprises a nozzle for engaging the pitcher when the pitcher is located in the docking station, wherein, when the nozzle is lifted with the fluid container, the nozzle engages the valve and releases the liquid from the pitcher into the fluid container, and wherein the nozzle includes a narrow tip provided in an opening of the docking station and movable vertically for engaging the valve.

2. The refrigerator of claim 1, wherein the docking station is coupled to an interior portion of the door.

3. The refrigerator of claim 1, wherein the nozzle includes a circular bezel for receiving a fluid container.

4. The refrigerator of claim 3, wherein the circular bezel includes a plurality of spokes extending from a center to an outer edge, and wherein the circular bezel comprises an antimicrobial material.

5. The refrigerator of claim 1, wherein the pitcher includes a removable lid having a channel for engaging with a water dispenser coupled to the water line in the refrigerator.

6. A liquid dispensing system for a refrigerator, the liquid dispensing system comprising:

a pitcher having a pitcher body and a lid removably engaged with the pitcher body;

a docking base for supporting the pitcher in the refrigerator and positioning the pitcher to engage with a water dispenser of the refrigerator to automatically fill the pitcher; and a dispenser integrated into the docking base for dispensing liquid from the pitcher while the pitcher is supported in the docking base;

wherein a fluid container may engage the dispenser for opening a fluid channel between the pitcher and the fluid container, wherein the dispenser includes a bezel for engaging the fluid container, the bezel having an outer edge that surrounds an opening of the fluid container to prevent a liquid from spilling out of the fluid container, wherein the pitcher includes a passage selectively opened by a valve, wherein the dispenser includes a nozzle tip for selectively engaging the valve, and wherein the dispenser includes a pivot bias toward a user to prevent swaying of an access door for the refrigerator.

7. The system of claim 6, wherein the bezel includes a plurality of spokes extending between the outer edge.

8. The system of claim 7, wherein the plurality of spokes are provided with an antimicrobial material.

9. The system of claim 6, wherein the dispenser may be raised from a disengaged position to an engaged position via a user lifting the fluid container against the dispenser; and wherein, in the engaged position, the fluid channel is opened for dispensing liquid from the pitcher into the fluid container.

10. The system of claim 6, wherein the docking base includes a spring for adjusting the position of the pitcher relative to the water dispenser.

\* \* \* \* \*